(No Model.)
J. W. CHENEY.
TOOL HANDLE.
No. 453,622. Patented June 9, 1891.
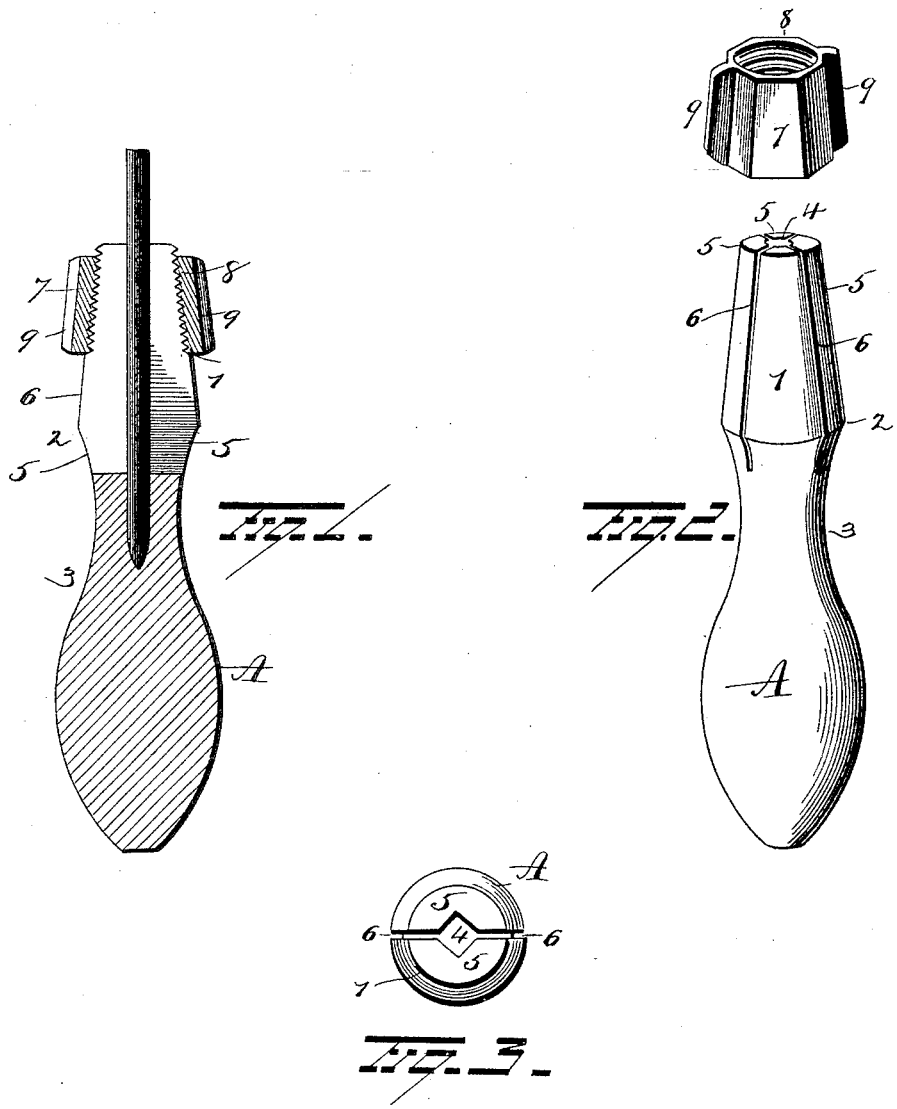

UNITED STATES PATENT OFFICE.

JAMES W. CHENEY, OF INDIANAPOLIS, INDIANA.

TOOL-HANDLE.

SPECIFICATION forming part of Letters Patent No. 453,622, dated June 9, 1891.

Application filed November 18, 1889. Serial No. 330,683. (No model.)

*To all whom it may concern:*

Be it known that I, JAMES W. CHENEY, of Indianapolis, in the county of Marion and State of Indiana, have invented certain new and useful Improvements in Tool-Handles; and I do hereby declare the following to be a full, clear, and exact description of the invention, such as will enable others skilled in the art to which it appertains to make and use the same.

My invention relates to an improvement in tool-handles, the object being to provide a simple and inexpensive handle for tools capable of quick adjustment and designed to hold a variety of different shapes and sizes of tool-shanks; and with this end in view my invention consists in a tool-handle having a restricted central portion and tapering gradually and uniformly from one end to this restricted portion, and divided by one or more kerfs which extend well into the restricted portion to form spring-jaws, which have a socket at their axial center to receive the shank of a tool, in connection with a nut or band having internal screw-threads and corresponding in shape with the tapering end of the handle and substantially equal in internal diameter at its smaller end with the small end of the handle when the jaws are in contact with the shank of a tool, said nut or band adapted to cut its own thread on the tapering portion of the handle and capable of passing to the restricted portion of the handle, whereby an equal pressure is exerted at all points beneath the nut or band upon the shank.

In the accompanying drawings, Figure 1 is a view in section of one form of tool-handle. Fig. 2 is a view in perspective of a modification, showing the parts detached; and Fig. 3 is an end view of the construction illustrated in Fig. 1.

A represents the body of the handle, it being preferably turned from some hard wood—such as hickory—in substantially the shape shown. The end 1 of the handle tapers gradually and uniformly from the point 2 to the extreme end, and on the other side of this point 2 the handle is considerably restricted, as shown at 3, for some distance until it gradually increases in size to form the body of the handle or the handle proper. A square, round, or flat socket 4 is made axially and longitudinally in this tapering end to receive the shank of the tool to be held, and this tapering portion is divided into several (preferably four) spring-jaws 5 5 by means of the kerfs 6 6, cut radially between them. These kerfs are extended well into the restricted portion 3 of the handle—that is, beyond point 2—in order to give the required spring or yielding capacity to the jaws. Said jaws maintain a uniform position normally and the shank of the tool slips easily into the socket prepared for it.

A tapering band or nut 7, made in shape, at least in its interior, to conform to the tapering end 1 of the handle and substantially equal in internal diameter at its smaller end with the small end of the handle, is furnished inside with screw-threads 8 8, which are calculated to form corresponding threads on the jaws as far up thereon as they are required, even to the point 2, to retain the ring in place on the jaws, in order to obtain the required as well as an equal pressure upon the jaws.

The parts are so formed that the tapering end of the handle which constitutes the jaws and the interior formation of the ring exactly correspond—that is, when the ring is placed on the tapering end its threads all lie against the tapering end of the handle, so that as soon as the ring is turned it forms its threads, and not only this, but the ring as it rides upon the handle forces the jaws in contact with the shank of the tool with equal pressure upon as much of the surface of the tool-shank as happens to be encircled by it. The kerfs 6 6 are wide enough, and there is no external impediment, so that the pressure or embrace of the jaws upon the shank of the tool is perfect, no matter what the shape of the shank happens to be, for by virtue of the jaws being entirely of wood any give to them resulting from the equally-applied external pressure results in crowding the jaws inward to impinge against and exactly conform to the shape of the tool-shank, whether it be round or angular. The hand or nut preferably has an angular exterior, and may also have ears 9 9, by means of which it is easily turned. As the smaller portion of the taper becomes worn, the nut may be turned farther back toward the point 2, there being nothing to stop it.

In the modification the only difference exists in the number of jaws, in this form there being four instead of two, as in the other form.

Having fully described my invention, what I claim as new, and desire to secure by Letters Patent, is—

As an article of manufacture, a tool-handle having a restricted central portion and tapering gradually and uniformly from one end to this restricted portion, and this tapering end divided by one or more kerfs which extend well into the restricted portion, to form spring-jaws which have a socket at their axial center to receive the shank of a tool, and a nut or band having internal screw-threads and corresponding in shape with the tapering end of the handle and substantially equal in internal diameter at its smaller end with the small end of the handle when the jaws are in contact with the shank of the tool, said nut or band adapted to cut its own thread on the tapering portion of the handle and capable of passing to the restricted portion of the handle, whereby an equal pressure is exerted at all points beneath the nut or band upon the shank, substantially as set forth.

In testimony whereof I have signed this specification in the presence of two subscribing witnesses.

JAMES W. CHENEY.

Witnesses:
WILLIAM A. VAN BUREN,
MERRILL MOORES.